J. G. PERRY.
Nut-Lock.

No. 167,469. Patented Sept. 7, 1875.

Witnesses:
S. E. Perry
M. F. Perry

Inventor:
John G Perry

2 Sheets--Sheet 2.

J. G. PERRY.
Nut-Lock.

No. 167,469.   Patented Sept. 7, 1875.

Witnesses:
S. E. Perry
M. F. Perry

Inventor:
John G. Perry

N. PETERS, PHOTO-LITHOGRAPHER, WASHINGTON, D C.

UNITED STATES PATENT OFFICE.

JOHN G. PERRY, OF KINGSTON, RHODE ISLAND.

IMPROVEMENT IN NUT-LOCKS.

Specification forming part of Letters Patent No. 167,469, dated September 7, 1875; application filed March 23, 1874.

*To all whom it may concern:*

Be it known that I, JOHN G. PERRY, of Kingston, in the county of Washington and State of Rhode Island, have invented an Improved Nut-Lock, of which the following is a specification, describing its construction, application, and operation, reference being had to the accompanying drawings making part of the same, and to the letters of reference marked thereon, similar letters denoting similar parts thereof.

Figure 1:
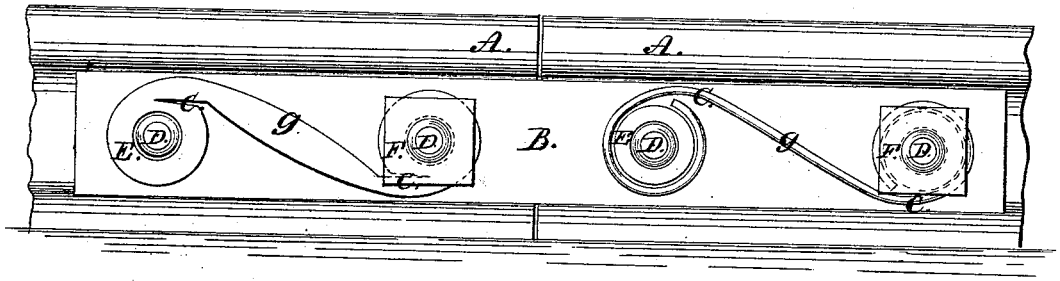
Figure 2:
Figure 3:
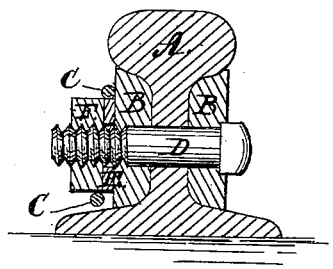
Figure 4:
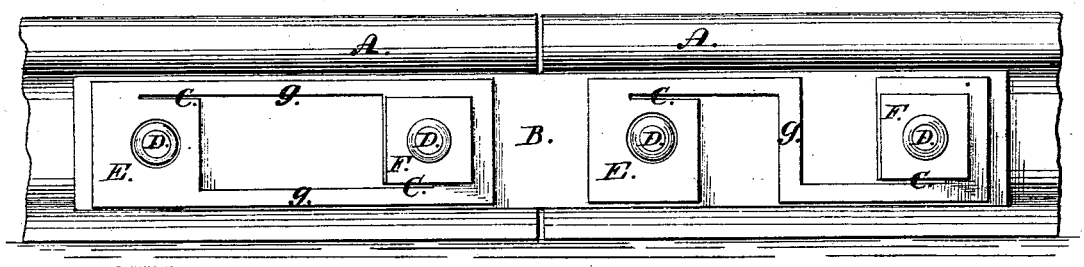

Figures 1, 4, 5 and 6 are side elevations of these locks, double and single, with two bolts, as generally used at the ends of each railroad-rail in making the joints, showing their washers and a part of the nuts in position. Fig. 2 is a top view of the locks. Fig. 3 is a sectional view of the lock, washer, nut, bolt, fish-plates and rail combined.

A is the rail; B B, the fish-plates; C, the lock; D, the bolt; E, the washer; and F, the nut.

Figures 5, 6:
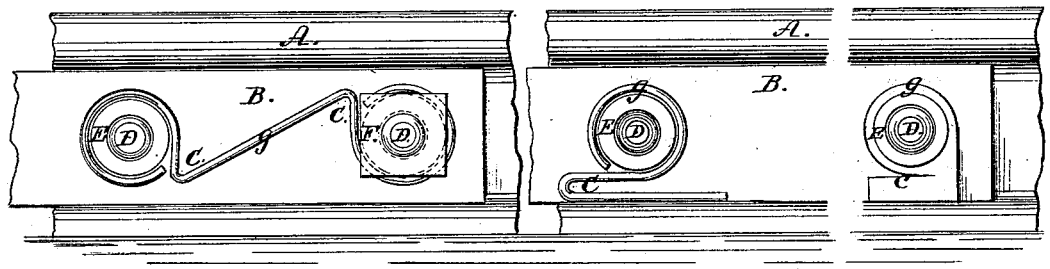

The invention consists in constructing and applying nut-locks and washers, double and single, and either in one or separate pieces of metal strips died into shape, or of pieces of wire, round, square, or flat, formed up, the double locks being connected by the parts $g$, reaching from bolt to bolt, and raised up, as at Figs. 1, 2, 4 and 5, for two or more bolts and nuts, and the single locks, formed as may be seen at Fig. 6, for single bolts and nuts. Those made of wire are bent around in a scroll, and those made of sheet metal are punched so as to fit on the bolts, and make the washers in the same pieces with the locks, or the pieces of wire may be bent around once, and the sheet-metal strips may be punched large enough for the reception of ordinary washers, made in separate pieces, as at Figs. 5, 6, and the right-hand half of Fig. 1.

These locks and washers are put on the bolts, and the nuts are then put on and screwed down upon the washers and ends of the locks. The locks are held from turning by the bolts and lip of the rails, as shown in the various figures. The locks are made of spring metal, and as the nuts are screwed on their corners will press down the springs and pass over them, and when the nuts are in place the locks will spring up, as at Fig. 2, and hold the nuts from turning back, or the locks may be made of anti-spring metal, and be bent up or down.

When it is necessary to remove the nuts the locks can be sprung or bent down, so that the nuts will turn back freely over them. I prefer brass metal for these locks, especially for railroad use, as that metal will not rust and cause trouble on that account. And not only does their being made separate from the washers and of thinner metal, or the raised portion resting against the lip of the rail, prevent these locks and nuts from turning, but their being connected from bolt to bolt keeps the locks from vibrating by the moving of the cars, and saves them from being weakened and broken and the nuts from coming off from that cause, and makes them doubly safe. They are also simple as well as effective, and can be made very cheap.

Having thus described my improvements in nut-locks, I claim—

1. The double locking device C C, united by the raised portions, substantially as described.

2. The combination of the locking device $g$ and the circular washer E, substantially as described.

JOHN G. PERRY.

Witnesses:
S. E. PERRY,
H. B. PERRY.